US012304990B2

(12) United States Patent
Guest et al.

(10) Patent No.: US 12,304,990 B2
(45) Date of Patent: May 20, 2025

(54) METHOD AND APPARATUS FOR LINING A PIPE

(71) Applicant: AXALTA COATING SYSTEMS IP CO., LLC, Wilmington, DE (US)

(72) Inventors: Peter Guest, Nottingham (GB); Geoff Quinton, Rawtenstall (GB)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 308 days.

(21) Appl. No.: 17/819,033

(22) Filed: Aug. 11, 2022

(65) Prior Publication Data
US 2022/0380514 A1 Dec. 1, 2022

Related U.S. Application Data

(63) Continuation of application No. 16/368,118, filed as application No. PCT/GB2017/052957 on Oct. 2, 2017, now abandoned.

(30) Foreign Application Priority Data

Sep. 30, 2016 (GB) ...................................... 1616654

(51) Int. Cl.
*C08G 18/10* (2006.01)
*B05C 7/00* (2006.01)
(Continued)

(52) U.S. Cl.
CPC ............... *C08G 18/10* (2013.01); *B05C 7/00* (2013.01); *B05D 7/225* (2013.01);
(Continued)

(58) Field of Classification Search
CPC .......... C08G 18/32; C08G 18/36; C08K 3/04; C08K 5/17; C08K 7/06; C08K 2201/004;
(Continued)

(56) References Cited

U.S. PATENT DOCUMENTS 3,380,950 A  4/1968 Friedrich
4,438,072 A * 3/1984 Nothnagel ................ B29B 7/38
                                                        134/22.12
(Continued)

FOREIGN PATENT DOCUMENTS

CN      201012351 Y    1/2008
CN      101638552 A    2/2010
(Continued)

OTHER PUBLICATIONS

Alaa, M.A. et al. "Pure polyurethane and castor oil based polyurethane: synthesis and characterization", Journal of Mechanical Engineering and Sciences, Jun. 2015, pp. 1507-1515, vol. 8.
(Continued)

*Primary Examiner* — Michael M. Robinson
(74) *Attorney, Agent, or Firm* — Lorenz & Kopf, LLP

(57) ABSTRACT

A composition for application to a substrate is provided. The composition comprises a base component and an activator component. The base component comprises hydroxyl functional prepolymers and the activator comprises isocyanate prepolymers. The composition further comprises an amount of carbon fibre. The hydroxyl functional prepolymers are formulated to polymerise with the isocyanate prepolymers to form a polymer containing carbon fibre.

18 Claims, 6 Drawing Sheets

(51) Int. Cl.
*B05D 7/22* (2006.01)
*C08G 18/08* (2006.01)
*C08G 18/24* (2006.01)
*C08G 18/32* (2006.01)
*C08G 18/36* (2006.01)
*C08G 18/76* (2006.01)
*C08K 3/04* (2006.01)
*C08K 3/22* (2006.01)
*C08K 3/30* (2006.01)
*C08K 3/34* (2006.01)
*C08K 3/36* (2006.01)
*C08K 5/17* (2006.01)
*C08K 7/06* (2006.01)
*C08L 75/06* (2006.01)
*C08G 18/18* (2006.01)

(52) U.S. Cl.
CPC ....... *C08G 18/0838* (2013.01); *C08G 18/242* (2013.01); *C08G 18/32* (2013.01); *C08G 18/36* (2013.01); *C08G 18/7664* (2013.01); *C08K 3/04* (2013.01); *C08K 3/22* (2013.01); *C08K 3/30* (2013.01); *C08K 3/346* (2013.01); *C08K 3/36* (2013.01); *C08K 5/17* (2013.01); *C08K 7/06* (2013.01); *C08L 75/06* (2013.01); *B05D 2503/00* (2013.01); *C08G 18/18* (2013.01); *C08K 2003/2241* (2013.01); *C08K 2003/3045* (2013.01); *C08K 2201/004* (2013.01); *C08L 2203/18* (2013.01)

(58) Field of Classification Search
CPC ......... C08L 75/06; C09D 175/04; B05B 1/06; B05B 1/14; B05B 3/02; B05B 7/04; B05C 7/00
See application file for complete search history.

(56) References Cited

U.S. PATENT DOCUMENTS

| | | | |
|---|---|---|---|
| 4,780,484 A | 10/1988 | Schubert et al. | |
| 7,504,052 B2 | 3/2009 | Ehbing et al. | |
| 8,945,434 B2 | 2/2015 | Krause et al. | |
| 2005/0133610 A1* | 6/2005 | Cowelchuk | B05B 7/0408 239/11 |
| 2005/0271881 A1 | 12/2005 | Hong | |
| 2008/0035894 A1 | 2/2008 | Ehbing et al. | |
| 2010/0230516 A1* | 9/2010 | Solie | B01F 25/4314 239/428 |
| 2010/0266764 A1* | 10/2010 | Robinson | C08G 18/10 427/236 |
| 2011/0147675 A1 | 6/2011 | Krause et al. | |
| 2012/0295104 A1 | 11/2012 | Barker | |
| 2017/0002231 A1 | 1/2017 | Hberle et al. | |
| 2017/0066867 A1 | 3/2017 | Ross et al. | |
| 2018/0104705 A1* | 4/2018 | Slutskii | C08G 18/42 |
| 2019/0185702 A1* | 6/2019 | Cash | C09D 7/70 |

FOREIGN PATENT DOCUMENTS

| | | |
|---|---|---|
| CN | 102757722 A | 10/2012 |
| CN | 202778850 U | 3/2013 |
| CN | 103237849 A | 8/2013 |
| CN | 104263226 A | 1/2015 |
| CN | 104540863 A | 4/2015 |
| CN | 105566892 A | 5/2016 |
| DE | 2740504 A1 | 3/1979 |
| DE | 19840051 A1 | 3/2000 |
| EP | 3023164 A1 | 5/2016 |
| KR | 101030477 B1 | 4/2011 |
| KR | 101812596 B1 | 12/2017 |
| WO | 0300014613 A1 | 2/2003 |
| WO | 2007006656 A1 | 1/2007 |
| WO | 2011092962 A1 | 8/2011 |
| WO | 2012035520 A1 | 3/2012 |
| WO | 2014029787 A1 | 2/2014 |
| WO | 2015135944 A1 | 9/2015 |

OTHER PUBLICATIONS

BYK. BYK-9077 Safety Data Sheet. May 10, 2021. (Year: 2021).
DesmodurVL Information. Covestro. Sep. 1, 2015. (Year: 2015).
Desmophen 1150 Information. Viverso. Nov. 15, 2011. (Year: 2011).
Dobrzanski et al. Structure and properties of ceramic preforms based on Al2O3 particles. Journal of Achievemnets in Materials and Manufacturing Engineering. 2009, 35(1), 7-13. (Year: 2009).
Epo, International Search Report, issued in IA No. PCT/GB2017/052957 dated Feb. 8, 2018.
Ethacure 100-LC Curative. Albemarle Corporation. 2001. (Year: 2001).
Evonik Industries AG. Tegostab 88411 Information. Sep. 7, 2011. (Year: 2011).
He, J., "New Fiber Materials", 1st Edition, Jul. 31, 2014, p. 361, Donghua University Press.
Arranaga, M.D. et al. "Hawley's Condensed Chemical Dictionary", Sixteenth Edition, 2016, p. 1131, John Wiley & Sons, Inc.
Sonnenschein, M. F., et al. "Polyurethanes" Encyclopedia of Polymer Science and Technology, 2011, John Wiley & Sons, Inc.
Szycher, M. "Szycher's Handbook of Polyurethanes" Second Edition, 2013, Taylor & Francis Group, LLC. Pages 37-52.
UKIPO, Combined Search and Examination Report issued in GB1716066.4, dated Mar. 28, 2018.
UKIPO, Combined Search and Examination Report issued in GB1902573.3, dated Aug. 30, 2019.

* cited by examiner

METHOD AND APPARATUS FOR LINING A PIPE

CROSS-REFERENCE TO RELATED APPLICATIONS

This application divisional application of U.S. application Ser. No. 16/368,118, filed on Mar. 28, 2019, which is a U.S. National-Stage entry under 35 U.S.C. § 371 based on International Application No. PCT/GB2017/052957, filed Oct. 2, 2017, which was published under PCT Article 21(2) and which claims priority to Great Britain Application No. 20160016654, filed Sep. 30, 2016, now patent numbers GB 2557410 and GB 2573378, which are all hereby incorporated in their entirety by reference.

TECHNICAL FIELD

The present disclosure relates to compositions, substrates to which said compositions have been applied, methods of applying said compositions to a substrate and apparatuses for applying compositions to substrates.

BACKGROUND

Water is typically supplied to domestic and commercial properties from water treatment centres via a network of water pipes. Similarly waste water is typically carried from properties to a water treatment centre via a network of wastewater pipes. This requires large pipeline networks, much of which is typically underground. Such pipes typically have a finite life span and when a pipe is no longer serviceable, it must be repaired or replaced to maintain the pipeline network.

Since many pipes are underground, repair or replacement often involves significant time and cost to access the pipe and either repair the pipe or replace it with a new one. This is particularly inconvenient where the pipe is located under a road or other thoroughfare. The present disclosure aims to reduce or overcome such problems.

SUMMARY

In a first aspect a composition for application to a substrate is provided, the composition comprising a base component and an activator component, wherein the base component comprises hydroxyl functional prepolymers and the activator component comprises isocyanate prepolymers, wherein the composition further comprises an amount of carbon fibre, and wherein the hydroxyl functional prepolymers are formulated to polymerise with the isocyanate prepolymers to form a polymer containing carbon fibre.

In exemplary embodiments, the composition is provided in two parts: a base and an activator, which are formulated to cure when mixed together. The base comprises hydroxyl functional prepolymers and the activator comprises isocyanate prepolymers which react together to form a polyurethane. In some embodiments, carbon fibres are present in the base component, i.e. prior to mixing with the activator. Additionally or alternatively, carbon fibres are present in the activator component.

Therefore, when the base component is mixed with the activator, the resulting polymer also comprises carbon fibres. It has been found that this results in a cured composition having advantageous properties, for example increased rigidity and improved abrasion resistance. Further, it has been found that when the composition is applied as a lining or coating of a pipe, additional advantageous properties are obtained. These include improved adherence to the pipe surface, improved chemical resistance to water and waste water, and increased burst pressure. Accordingly pipes having such advantageous properties can be produced by application of the composition disclosed herein as a pipe lining or coating.

Pipes, for example water pipes and sewerage pipes, are typically made from a plastics material, metal, concrete or clay, or any other suitable material commonly used in the industry, and have a finite life span. Advantageously, by lining such pipes with the composition disclosed herein, either before the pipe is introduced to a pipeline, a network or when in situ, the structural integrity of the pipe can be improved and hence the life span of the pipe can be increased. This saves both the cost associated with replacing worn out pipes and the associated inconvenience, for example where such replacement involves digging up roads to access the pipe.

Optionally, the base component comprises the amount of carbon fibre, and the carbon fibre content of the base component is between 5% and 40% of the base component by weight, for example between 5% and 30%.

Optionally the carbon fibre content of the base component is between 5% and 25% of the base component by weight, for example between 10% and 20%, for example between 15% and 20%.

Optionally the carbon fibres present are 500 μm in length or less, optionally 250μι η or less.

Optionally the carbon fibres present are 150 μm in length or less. Optionally the carbon fibres present are between 5 and 25μιη in thickness. In some embodiments the carbon fibres present are between 5μιη and 15μιη in thickness, for example between 5μιη and 10μιη optionally 7μιη.

It has been found that a composition comprising carbon fibres of the size and/or in the amount disclosed herein advantageously can be applied to a substrate by spraying the composition, for example using the apparatus disclosed herein. Accordingly a composition is provided which can be sprayed and which also has improved structural properties (e.g. increased strength) when cured.

Optionally the base component comprises amine functional prepolymers.

As will be understood by those skilled in the art, amine functional groups react with isocyanates to form a polyurea. Accordingly, by including amine functional prepolymers as well as hydroxyl functional prepolymers in the base component, a copolymer including both polyurea and polyurethane is formed when the base and activator components are mixed. Polyurea and polyurethane comprise different properties, for example polyurethane tends to be more thermoplastic and less heat resistant than polyurea. By including amine functional prepolymers and hydroxyl functional prepolymers, the properties of the resulting polymer will be influenced by those of both polyurea and polyurethane. In this way, the properties of the resulting polymer can be adjusted.

In addition, the reaction between amines and isocyanates is faster than that between hydroxyl groups and isocyanates. Accordingly, by including amine functional prepolymers, the time taken for the composition to cure can be adjusted. In addition, since the reaction between amines and isocyanates is faster than that between hydroxyl groups and isocyanates, the amine functional prepolymers in the base component will polymerise faster than the hydroxyl functional prepolymers. This results in faster thickening of the mixed composition as polyurea is formed. Including amine functional prepolymers therefore also acts as a thickener. The thickness of the mixed composition is important in controlling the flow of the mixed composition. For example, when the mixed composition is applied to line a pipe, it can be undesirable for the composition to flow down the sides of the pipe under gravity and collect at the lowermost edge of the pipe. By modifying the thickness of the mixed component, undesirable flow of the mixed composition can be minimised.

Optionally the amine functional groups are tertiary amines. Tertiary amines act as a catalyst for the reaction between hydroxyl functional groups and isocyanates. Therefore, including a tertiary amine in the base component has the advantage of accelerating the reaction between hydroxyl functional prepolymers and the isocyanate groups.

Optionally the ratio of polyurethane to polyurea in the resulting polymer is 5% to 100% polyurethane to 0% to 95% polyurea. In some embodiments, the base component is formulated such that 30-100% polyurethane to 0-70% polyurea is formed. In some embodiments, the base component is formulated such that 50%-100% polyurethane to 0-50% polyurea is formed. In some embodiments the resulting polymer comprises >95% polyurethane to <5% polyurea.

Optionally the base component comprises one or more polymer resins containing the base component prepolymers, wherein the amount of resin present in the base component is up to 70% by weight of the base component, optionally up to 55%, for example up to 35%.

Optionally the base component and activator component are formulated to be mixed in a ratio of 4:1 by volume of base component to activator component. Optionally the composition comprises a cure accelerator. Optionally the base component comprises a cure accelerator to accelerate curing of the composition. In some embodiments the activator component comprises a cure accelerator.

Varying the proportion of cure accelerator present in the composition has the advantage that the cure time of the composition can be adjusted as desired. This can be advantageous when a predetermined amount of time between mixing and curing is required for application of the composition to a substrate, e.g. a pipe. In other words, when it is necessary for the composition to remain as a liquid for a predetermined amount of time before hardening in order for the composition to be applied to a substrate. This ability to tailor the cure time is also important in ensuring that the substrate cures rapidly following application.

Optionally the cure accelerator is an amine based cure accelerator, optionally a tertiary amine based cure accelerator.

As described above, tertiary amines act as a catalyst for the reaction between hydroxyl functional prepolymers and isocyanate prepolymers. Therefore, including an amine based cure accelerator has the advantage of accelerating the reaction between hydroxyl functional prepolymers and the isocyanate prepolymers. Alternatively a metal based cure accelerator, for example a tin based cure accelerator may be used.

Optionally the base component comprises hydroxyl functional prepolymers having two or more different structures. In exemplary embodiments, the base component comprises a first of hydroxyl prepolymer having a first structure, and a second hydroxyl prepolymer having a second structure. By using a combination of hydroxyl functional prepolymers, the properties of the final cured composition can be modified as desired. For example, using a blend of prepolymers enables the desired flexibility and hardness to be achieved in the cured composition.

Optionally the composition comprises a drying additive formulated to remove moisture from the composition. In some embodiments the base component comprises the drying additive. In some embodiments the activator component comprises the drying additive.

As will be understood by those skilled in the art, isocyanates react with water in preference to amines or hydroxyl functional groups. Accordingly, if moisture is present, the isocyanates in the activator will react with the moisture in preference to the hydroxyl groups, and optionally amine groups, present in the base component. Therefore the desired polymer will not be formed.

Reducing or removing moisture from the composition therefore advantageously encourages the isocyanate in the activator to react with the hydroxyl groups, and optionally amine groups, present in the base component to form the desired polymer.

Optionally the composition comprises a catalyst which is formulated to catalyse the reaction between the hydroxyl functional prepolymers and the isocyanate groups. Addition of such a catalyst accelerates the cure reaction and so reduces the cure time. Therefore, by adjusting the amount of catalyst used, the cure time of the composition can be adjusted. In some embodiments the base component comprises the catalyst. In some embodiments the activator component comprises the catalyst.

In addition, the reaction between isocyanates and water produces $CO_2$ as a bi-product which results in undesirable bubbling in the resulting polymer. Accordingly, removal or reduction of the amount of water present in the composition and the mixed composition (i.e. the mixture of base component and activator component) is also advantageous in this regard.

Whilst the base component disclosed herein is described as comprising hydroxyl functional prepolymers, it will be understood that any hydroxyl functional composition may be used. Similarly, whilst the base component disclosed herein is described as optionally comprising amine functional prepolymers, it will be understood that any amine functional composition may be used.

It will be understood that the hydroxyl functional prepolymers may also contain other functional groups. In some embodiments, such other functional groups do not interfere with the reaction between the hydroxyl and/or amine functional groups and the isocyanate. For example, such other functional groups may be formulated such that they do not react with isocyanate groups.

It will be understood that the amine functional prepolymers may also contain other functional groups. In some embodiments, such other functional groups do not interfere with the reaction between the hydroxyl and/or amine functional groups and the isocyanate. For example, such other functional groups may be formulated such that they do not react with isocyanate groups. Whilst the activator component disclosed herein is described as comprising isocyanate prepolymers, it will be understood that any isocyanate functional composition may be used.

In a second aspect a substrate to which the composition disclosed herein has been applied is provided.

Optionally the substrate is a pipe and the pipe comprises a lining of the composition. Optionally the pipe is a water pipe, for example, for carrying potable or waste water. Optionally the substrate is a pipe and the pipe is formed of a metal, concrete, clay or plastics material, or any other material commonly used in the industry. The pipe may be any form of pipe commonly used in the industry.

In a third aspect an apparatus configured for application of the composition disclosed herein to a substrate is provided, the apparatus comprising:
- a first flow path for carrying a first component of a composition,
- a second flow path for carrying a second component of a composition,
- a mixer coupled to the first and second flow paths and configured to mix the first and second components together to form a mixed composition,
- an applicator head coupled to the mixer, the applicator head configured for rotation about an axis and comprising an applicator hole through which a mixed composition can pass such that, in use, a mixed composition can be applied to a substrate via rotation of the applicator head.

In exemplary embodiments, the apparatus disclosed herein is configured to apply a composition, e.g. a liquid composition, to a substrate, e.g. a pipe. Rotation of the applicator head generates a centrifugal force which causes the composition to atomise as it leaves the hole of the applicator head. In this way, an even application of the composition on the substrate can be achieved.

Since the apparatus is configured for application of the composition to a substrate via the centrifugal force generated by the applicator head, pressure need not be applied to push material from the applicator head. Rather material is applied to the substrate by virtue of the centrifugal force generated. This is particularly advantageous where the composition comprises carbon fibres since the application of pressure to push the material from an applicator can result in the clumping together of carbon fibres at the applicator nozzle or hole, which can result in a blockage of the hole.

Optionally the apparatus contains a composition comprising a base component and an activator component, wherein the first component comprises the base component and the second component comprises the activator component, wherein the base component comprises hydroxyl functional prepolymers and the activator comprises isocyanate prepolymers, wherein the composition further comprises an amount of carbon fibre, and wherein the hydroxyl functional prepolymers are formulated to polymerise with the isocyanate prepolymers to form a polymer containing carbon fibre. The apparatus may contain a composition comprising any optional feature herein disclosed, in particular any of the optional features described in relation to the composition according to the first aspect described above. Optionally the applicator hole has a diameter of 3 mm or more.

It has been found that, where the apparatus is used to apply a composition comprising carbon fibres to a substrate, an applicator head having a 3 mm hole is sufficiently large to prevent, or reduce, the risk of carbon fibres clogging or blocking the hole. Optionally the apparatus comprises a plurality of applicator holes spaced along the axial length of the applicator head.

In exemplary embodiments, an applicator head has a length of between 10 cm and 30 cm, for example between 15 cm and 20 cm, and the applicator holes are spaced along this length. In this way, a composition can be applied to a substrate in relatively large bandwidths enabling more even application of the composition. This applicator head is particularly advantageous where it is used to apply a composition in which the cure time of the composition can be varied. For example, the cure time of compositions disclosed herein can be adjusted such that a composition having a sufficiently long cure time can be provided to enable the composition to be applied to the substrate. In other words, the cure time can be tailored such that the mixed composition can travel a longer distance along the applicator head before curing.

Optionally the plurality of applicator holes are arranged in at least one spiral extending around a surface of the applicator head.

Optionally the plurality of applicator holes are arranged in a first spiral and a second spiral, wherein the first spiral is a right-handed spiral and the second spiral is a left-handed spiral. Optionally the applicator head comprises a truncated cone shaped portion, wherein the or each applicator hole is provided to extend through a surface of the truncated cone shaped portion.

Optionally the applicator head comprises a cylindrical portion, wherein the or each applicator hole is provided to extend through a surface of the cylindrical portion.

Optionally the applicator head is coupled to the mixer at a first end 80, and the applicator head comprises a second end 82 distal the first end 80, wherein the distal end is closed.

It has been found that by closing the distal end of the applicator cone, a smoother application of the mixed composition to the substrate can be achieved. It is thought that closing the distal end of the applicator head reduces undesirable air turbulence which can lead to uneven application of the composition. Optionally the applicator head is coupled to the mixer at a first end 80, and the applicator head comprises a second end 82 distal the first end 80, wherein the distal end is open. Optionally the first and/or second flow path comprises a diameter of 3 mm or greater along the length of the flow path.

In the case where the first component and/or second component comprises carbon fibres, it has been found that providing a flow path with a diameter of 3 mm or greater along the length of the flow path avoids, or substantially reduces, the risk of carbon fibres present in the component clumping together and forming blockages along the flow path. For example, the first flow path may be configured for carrying a first component comprising carbon fibre, and the first flow path may comprise a diameter of 3 mm or greater along its length.

Optionally the first and/or second flow path includes a hose coupled to the mixer and arranged to carry a component of a composition to the mixer, wherein the hose has a diameter of 25 mm or greater.

Optionally the first and/or second flow path includes a hose coupled to the mixer and arranged to carry a component of a composition to the mixer, wherein the hose has a diameter of between 5 and 25 mm, for example between 10 mm and 20 mm. Providing a first hose having a diameter of 25 mm or more has been found to reduce the shear forces applied to the component as it travels through the hose. In the case where the component is shear thickening, this reduction in the shear forces applied facilitates flow of the first component through the first hose. It has been found that base components of compositions disclosed herein, wherein the base component comprises carbon fibre, is shear thickening. For example, the first flow path may be for carrying a first component comprising carbon fibre, the first flow path including a hose coupled to the mixer and arranged to carry a first component to the mixer, wherein the hose has a diameter of 25 cm or greater.

Optionally the first and/or second flow path includes a hose coupled to the mixer and arranged to carry a component of a composition to the mixer, wherein at least a portion of the hose is lined with polytetrafluoroethylene (PTFE). In some embodiments, the first and/or second flow path is at least partially lined with PTFE.

It has been found that by lining at least part of a hose of the first and/or second flow path with PTFE, carbon fibres present in a component flowing through the hose are less likely to become embedded in the hose wall. When carbon fibres become embedded in the hose wall, they tend to clump together, clogging the flow line. Therefore, the use of PTFE reduces the likelihood of the flow line(s) becoming blocked. Further, since the use of PTFE reduces the risk of carbon fibres becoming clogging the flow line(s), the pressure applied to a component flowing through the flow line can be increased. This can be achieved by reducing the diameter of the flow line. Increasing the pressure applied to a component flowing through the line can be advantageous in ensuring the correct mix ratio of components. Optionally the first and/or second flow path includes a hose coupled to the mixer and arranged to carry a component of a composition to the mixer, wherein the hose has a diameter of between 5 mm and 10 mm e.g. 6.35 mm.

In some embodiments, the first flow path comprises a first hose and the second flow path comprises a second hose, wherein the first and second hoses have different diameters. For example, the second flow path may be for carrying a second component of the composition which does not comprise carbon fibre, the second flow path comprising a hose coupled to the mixer and arranged to carry the second component to the mixer, wherein the hose has a diameter of between 5 and 10 mm.

Optionally the apparatus comprises a reservoir for housing a first or second component of a mixture. Optionally the reservoir comprises an outlet in fluid communication with the first or second flow path, wherein the outlet has a width of 60 mm or more, optionally 70 mm or more.

Providing a reservoir having an outlet with a width of 60 mm or more, for example 70 mm or more, has been found to reduce the shear forces applied to a component as it leaves the reservoir.

Therefore, where the component is shear thickening, flow of the component through from the reservoir is facilitated. In some embodiments, the outlet has a diameter of 76.2 mm. For example, the reservoir may be for housing a first component which comprises carbon fibre.

Optionally the first reservoir comprises a side and a base coupled to the side, wherein the reservoir is provided with a heating jacket extending around the side and base of the reservoir.

The heating jacket is configured to apply heat to the reservoir. By extending the heating jacket around the side (or sides) and base of the reservoir, more effective heating can be achieved. This is advantageous since higher temperatures, e.g. 50° C. to 70° C. can be achieved. Such high temperatures may be advantageous in improving the flow of a component, for example the base component of exemplary compositions disclosed herein. In some embodiments, the heating jacket comprises a two skins and an insulating space therebetween. Optionally the first flow path comprises a filter for removal of contaminants, wherein the filter comprises a mesh size of 3 mm or greater. Optionally the first and second flow paths each comprise a pump, wherein the pumps are adapted to pump a first component and a second component to the mixer in ratio of 4:1 by volume of a first component to a second component.

Optionally the first flow path is configured to be coupled to the mixer via a non-return valve, wherein the non-return valve comprises a diameter of 10 mm or more, for example 15 mm or more. In some embodiments, a non-return valve having a diameter of 19.05 mm (¾") is used.

Optionally, the first and/or second flow path comprises a flow meter for measuring flow through the respective flow path, for example, the flow meter comprises a helical gear flow meter.

In a helical gear flow meter, an arrangement of helical or spiral shaped gears is provided to measure flow through the flow meter. It has been found that the use of a helical gear flow meter is advantageous since carbon fibre present in a component flowing through the flow meter tends not to clog the helical gears.

In some embodiments, the flow meter comprises positive displacement flow meter, for example a gear flow meter.

In a fourth aspect a method of applying a composition as disclosed herein to a pipe is provided, the method comprising:
providing the base component and the activator component;
mixing the base component and the activator component to form a mixed composition;
applying the mixed composition to line a pipe.

In a further aspect a composition is provided comprising a base component and an activator component, wherein the composition comprises carbon fibre and at least one of: a liquid polymer resin including a hydroxyl functional prepolymer, a filler liquid, a mineral pigment, a colour pigment, a moisture scavenger additive, a thickener, a liquid polymer resin including an amine functional prepolymer, a cure accelerator, and an isocyanate polymer blend.

In a further aspect a composition is provided comprising a base component and an activator component, wherein the composition comprises carbon fibre, for example Sigrafil C M150-3.0, and at least one of: Isopol 160-3500, Desmophen® 1150, Isopol 230-3000, Desmophen® 1145, Castor oil, Sillitin Z 86 puriss, Portaryte® B15, Titanium dioxide, Sylosiv® A3, Cab-o-sil® TS-720, Ethacure® 100, Dabco® 33-LV, Desmodur® VL and Suprasec® 2496.

In a further aspect a method of manufacture of a composition for application to a substrate is provided, the composition comprising a base component and an activator component, wherein the method comprises preparation of the base component in accordance with the following steps:
a) introducing ingredients into a vessel, the ingredients including: an amount of polymer resin comprising hydroxyl functional prepolymers,
b) adding an amount of carbon fibre, and
c) mixing to disperse the carbon fibre in the mixture;
and wherein the method further comprises preparation of the activator component including providing a polymer resin comprising isocyanate prepolymers.

Optionally, preparation of the base component further comprises adding an amount of polymer resin comprising amine functional prepolymers.

Optionally, the polymer resin comprising amine functional prepolymers is added after the carbon fibre has been fully dispersed. It is believed that the carbon fibre may absorb some of the polymer resin comprising amine functional prepolymers. Accordingly the polymer resin comprising amine functional prepolymers is added after the carbon fibre is fully dispersed. It is believed this promotes the reactivity of the base composition.

Optionally, the preparation of the base component further comprises introducing one or more of the following ingredients: a drying additive formulated to remove moisture from the composition, a mineral pigment, and a colour pigment.

Optionally, the preparation of the base component further comprises introducing one or more of the following additional ingredients at step a): a drying additive formulated to remove moisture from the composition, a mineral pigment, and a colour pigment. Optionally, preparation of the base component comprises mixing the ingredients, prior to addition of the carbon fibre, at speeds of 250 to 10000 rpm, for example 500 to 5000 rpm until a dispersion of 4-5 hegman is achieved. It has been found that such mixing speeds are not possible after the carbon fibre has been added.

Optionally, preparation of the base component comprises introducing more than one polymer resin comprising hydroxyl functional prepolymers at step a). It has been found that addition of all the liquid resins at the beginning of the process facilitates the manufacturing process. It has also been found that the resins mix together easily and so high speed dispersion is not required at this stage.

Optionally, preparation of the base component further comprises adding an amount of thickener to the mixture. Optionally, the thickener is added after addition of the carbon fibre and/or after addition of the or a polymer resin comprising amine functional prepolymers. Due to the large viscosity increase when the thickener is added, this is added towards the end of the process when the majority of the components and ingredients have been introduced.

Optionally, preparation of the base component further comprises adding an amount of cure accelerator and/or catalyst to the mixture. Optionally, preparation of the base component further comprises the step of passing the mixture through a 3 mm mesh, optionally this is carried out as a final step of the preparation of the base component. This removes any contaminants from the mixture.

BRIEF DESCRIPTION OF THE FIGURES

Embodiments will now be described with reference to the accompanying drawings, in which.

DETAILED DESCRIPTION

Figure 1:
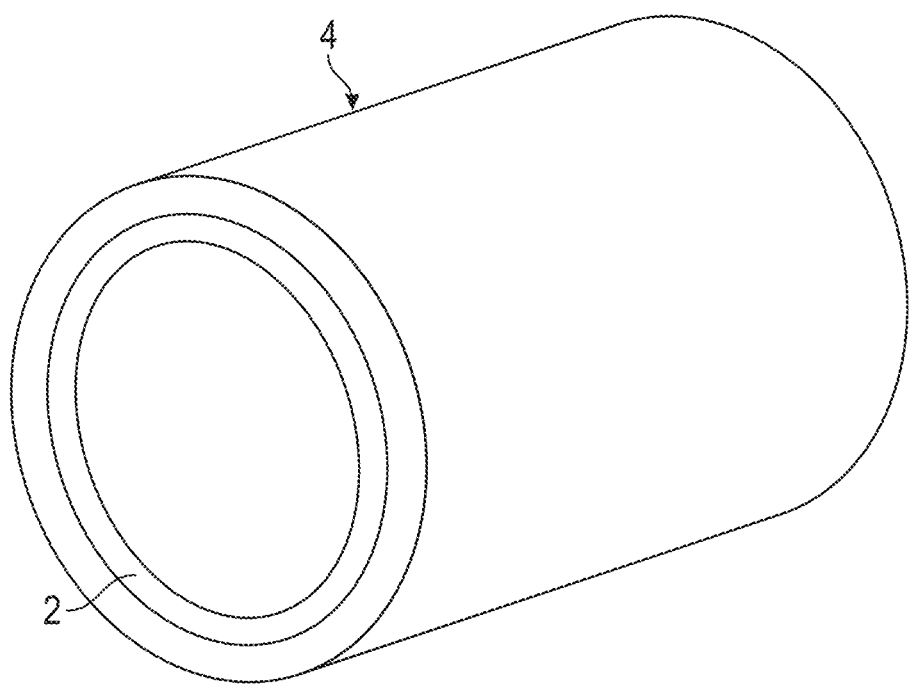
FIG. 1 is a schematic illustration of a pipe to which a composition according to the present disclosure has been applied as a lining.

With reference to FIG. 1, compositions 2 disclosed herein can be applied to a pipe 4, for example a water pipe, such that the composition 2 is applied to line the interior of the pipe 4. The composition comprises two components: a base and an activator which, when mixed to form a mixed composition, cure to form a hard, impervious coating on the pipe. This coating enhances the structural integrity of the pipe and so enables the pipe to remain in service for a longer period of time.

The examples herein are provided to facilitate an understanding of the disclosure. The examples are not intended to limit the scope of the claims.

Example 1

A composition for lining a pipe was made using a base component and an activator component having the following constituents:

| Constituent | Percentage by weight of the respective component |
|---|---|
| Base Component | |
| Liquid polymer resin including a hydroxyl functional prepolymer In some embodiments the liquid polymer resin includes the product sold as Isopol 160-3500 and/or the product sold as Isopol 230-3000 by Iso-elektra GmbH, and/or the product sold as Desmophen ® 1150 and/or the product sold as Desmophen ® 1145 by Covestro. | In some embodiments, the liquid polymer resin including a hydroxyl functional prepolymer makes up to 80% by weight of the base component, for example up to 70%, for example up to 60%, for example up to 50%, for example up to 40% of the base component. In some embodiments, the liquid polymer resin including a hydroxyl functional prepolymer makes up between 80% and 30% of the base component by weight, for example between 75% and 50%, for example between 70% and 60%. |
| Filler liquid For example, the filler liquid may be castor oil. | In some embodiments, the filler liquid makes up to 5% of the base component. For example, between 3% and 4% of the base component. It will be understood that any volume of filler liquid may be used to make the base component up to the desired volume. |
| Mineral pigment For example silica, e.g. kaolin. For example micronised silica e.g. kaolin. In some embodiments, the product sold as Sillitin Z 86 puriss by Hoffmann Mineral is used. | In some embodiments, the silica based mineral pigment makes up to 40%, for example between 10% and 30%, for example between 10% and 20%. In some embodiments the base component includes between 15% and 20% silica mineral pigment. |
| Mineral pigment For example, barium sulphate. For example micronised barium sulphate. In some embodiments the product sold as Portaryte ® B15 sold by Sibelco Specialty Minerals Europe is used. | In some embodiments, the barium sulphate based mineral pigment makes up to 40%, for example between 10% and 30%, for example between 15% and 25%. In some embodiments the base component includes between 20% and 25% barium sulphate based mineral pigment. |

-continued

| Constituent | Percentage by weight of the respective component |
|---|---|
| Colour pigment<br>For example a colour pigment dispersion in solvent, e.g. titanium dioxide pigment, or other desired colour pigment. | In some embodiments, the base component comprises 10% or less colour pigment by weight, for example, up to 5% colour pigment by weight. For example up to 3% colour pigment may be used, for example less than 1% colour pigment may be used. In some embodiments, any amount of pigment sufficient to achieve the desired colour is used. |
| Moisture scavenger liquid or solid<br>For example a zeolite based moisture scavenger pigment. For example, the product sold as Sylosiv ® A3 by W. R. Grace & Co. | In some embodiments, the base component comprises up to 10% of zeolite based moisture scavenger by weight, for example between 2 and 8%, for example between 3 and 7%, for example between 4 and 6%. In some embodiments, the base component comprises 5% zeolite based moisture scavenger. |
| Thickener<br>In some embodiments a silicate based thickener powder is used, for example the product sold as Cab-o-sil ® TS-720 by Cabot Corporation. | In some embodiments, the base component comprises up to 1.5% silicate based thickener by weight, for example between 1% and 1.5%. In some embodiments, the base component comprises between 1.1% and 1.4% silicate based thickener, for example between 1.2% and 1.3% silicate based thickener. |
| Liquid polymer resin including an amine functional prepolymer<br>In some embodiments the product sold as Ethacure ® 100 by Albemarle Corporation is used. | In some embodiments, the base component comprises up to 1% liquid polymer resin including an amine functional prepolymer, for example between 1% and 1.5%. In some embodiments, the base component comprises between 0.2% and 0.8% liquid polymer resin including an amine functional prepolymer, for example between 0.2% and 0.6%, for example between 0.3% and 0.5%. |
| Cure accelerator<br>In some embodiments, an amine based cure accelerator is used e.g. a tertiary amine, for example for example an amine based liquid cure accelerator. In some embodiments the product sold as Dabco ® 33-LV sold by Air Products and Chemicals, Inc.<br>In some embodiments a tin based cure accelerator is used, for example a tin based cure accelerator liquid, e.g. dibutyltin dilaurate. In some embodiments a bismuth based cure accelerator is used. | In some embodiments, the base component comprises up to 2.5% of amine based cure accelerator, for example up to 2%, for example up to 1% of amine based cure accelerator. In some embodiments less than 0.5% of amine based cure accelerator is used. |
| Carbon Fibre<br>In some embodiments milled carbon fibre powder is used, for example the product sold as Sigrafil C M150-3.0 by SGL Group. | In some embodiments, the base component includes between 5% and 40% of carbon fibres by weight, for example between 5% and 30%. In some embodiments, the base component includes between 5% and 25% of carbon fibres by weight, for example between 10% and 25%, for example between 15% and 20%. |
| Catalyst<br>In some embodiments a catalyst is used to catalyse the reaction between the hydroxyl functional prepolymers and the isocyanate groups of the activator component. Any suitable catalyst may be used, for example a metal catalyst, for example a tin or bismuth based catalyst may be used. For example, the product sold as TIB KAT ® 716 by TIB Chemicals may be used. | In some embodiments, the base component includes 1% or less of catalyst by weight, for example 0.5% or less. In some embodiments 0.2% or less of catalyst is used, for example 0.1%. In some embodiments, no catalyst is used. |
| Activator Component | |
| Liquid isocyanate polymer blend<br>For example, the product sold as Desmodur ® VL sold by Covestro is used. For example, the product sold as Suprasec ® 2496 sold by Huntsman Corporation is used. | Up to 100% |

The base component includes a liquid polymer resin including a hydroxyl functional prepolymer. In other words, the liquid polymer resin includes prepolymers having -OH functional groups. In some embodiments, the liquid polymer resin includes polyols. In some embodiments, the liquid polymer resin has a castor oil base.

In some embodiments, the base component includes a blend of two or more different liquid polymer resins including hydroxyl functional prepolymers. In some embodiments, the different liquid polymer resins are present in equal proportions by weight of the base component. In other embodiments, the different liquid polymer resins are present in different proportions by weight of the base component. Different liquid polymer resins result in different properties of the resulting polymer, depending on the nature of the prepolymers contained in the liquid polymer resins. For example, the degree of flexibility or hardness of the resulting polymer can be affected by the liquid polymer resin used. By including a blend of two or more different liquid polymer resins, the properties of the resulting polymer can be tailored as desired, depending to the requirements of the resulting polymer.

In some embodiments, the base component includes a liquid polymer resin including amine functional prepolymers. In other words, the liquid polymer resin includes prepolymers having amine functional groups. As will be understood by those skilled in the art, amine functional groups react with isocyanates to form a polyurea. Accordingly, by including amine functional prepolymers as well as hydroxyl functional prepolymers in the base component, a copolymer including both polyurea and polyurethane is formed when the base and activator components are mixed.

Polyurea and polyurethane have different properties, for example polyurethane tends to be more thermoplastic and less heat resistant than polyurea. By adjusting the amount and type of liquid polymer resin including amine functional prepolymers as compared with the amount and type of liquid polymer resin including hydroxyl functional prepolymers, the ratio of polyurethane to polyurea in the resulting polymer can be adjusted. Hence the properties of the resulting polymer are consequently adjusted.

In addition, the reaction between amines and isocyanates is faster than that between hydroxyl groups and isocyanates. Accordingly, by adjusting the amount and type of liquid polymer resin including amine functional prepolymers as compared with the amount and type of liquid polymer resin including hydroxyl functional prepolymers, the time taken to cure can be tailored.

In some embodiments the proportion of hydroxyl functional groups to amine functional groups present in the liquid polymer resin(s) of the base component is 2% hydroxyl to 98% amine. In some embodiments, the liquid polymer resin(s) of the base component contains exclusively hydroxyl function groups, in other words there is no amine present. All combinations of amine/hydroxyl functional groups between these two extremes are possible.

In some embodiments, the base component is formulated such that 5-100% polyurethane to 0-95% polyurea is formed. In some embodiments, the base component is formulated such that 30-100% polyurethane to 0-70% polyurea is formed. In some embodiments, the base component is formulated such that 50%-100% polyurethane to 0-50% polyurea is formed. In some embodiments the resulting polymer comprises >95% polyurethane to <5% polyurea.

Since the reaction between amines and isocyanates is faster than that between hydroxyl groups and isocyanates, the liquid polymer including amines will polymerise faster than the liquid polymer including hydroxyl groups. This results in faster thickening of the mixed composition as polyurea is formed. The liquid polymer resin including amine functional prepolymers therefore also acts as a thickener. The thickness of the mixed composition is important in controlling the flow of the mixed composition. In some embodiments, when the mixed composition is applied to line a pipe, it is undesirable for the composition to flow down the sides of the pipe under gravity and collect at the lowermost edge of the pipe. By modifying the thickness of the mixed component, undesirable flow of the mixed composition can be minimised.

In some embodiments, the base includes an amount of filler liquid to make the base component up to a desired volume. The filler liquid is formulated such that it does not react with the activator component of the composition. In some embodiments, the filler liquid is castor oil. In some embodiments, the base component includes an amount of mineral pigment. For example, one or more mineral pigments may be present. Such mineral pigments impart different physical and chemical properties to the resulting cured composition, accordingly, mineral pigments can be selected to provide desired properties to the resulting cured composition. For example, properties such as strength, density, rigidity, hardness, water resistance and elasticity of the resulting cured composition can be modified by including suitable mineral fillers. Any mineral pigment which is inert, chemical resistant, and acid and alkaline resistant may be used. In some embodiments, a combination of silica, e.g. Kaolin, and barium sulphate filler is used. This results in increased strength, increased density, increased rigidity, increased hardness, increased water resistance and reduced elasticity of the resulting cured composition. This improves the effectiveness of the resulting cured composition as a pipe liner.

If desired, a colour pigment can be added to the primer formulation to give the primer a desired colour. Any colour pigment may be used as desired. Alternatively, no colour pigment need be added.

In some embodiments the base component also includes a moisture scavenger component or drying additive. Any suitable moisture scavenger liquid or solid may be used. As will be understood by those skilled in the art, isocyanates react with water in preference to hydroxyl and amine groups. Therefore, it is important that excess moisture is removed from the base component before it is mixed with the activator component to ensure that the isocyanate in the activator react with the liquid polymer resin (i.e. the hydroxyl functional groups) in the base to form the desired polymer, rather than any water contained therein.

Water can, for example, be present in the filler pigments included in the base component, for example the colour pigment. Accordingly, including a drying additive in the base component acts to reduce or remove this water.

The base component may also contain a thickener, for example a mineral thickener and/or a liquid thickener, which acts to keep the various fillers, additives and constituents dispersed throughout the formulation, for example by altering the rheology of the mixture. In some embodiments, a mineral based, for example a silicate based, thickener is used. The thickness of the base component is important in controlling the flow of the mixed composition i.e. the mixture of the base component and activator component. In some embodiments, when the mixed composition is applied to line a pipe, it is undesirable for the composition to flow down the sides of the pipe under gravity and collect at the lowermost edge of the pipe. By modifying the thickness of the base component, undesirable flow of the mixed composition can be minimised.

In order to adjust and/or tailor the time taken for the mixed composition to cure, a cure accelerator may be included in the base component. The cure time will therefore depend, at least in part, on the amount of cure accelerator present. Any cure accelerator which acts to catalyse the reaction between the hydroxyl functional groups of the liquid polymer resin and the isocyanate in the activator may be used, for example an amine based cure accelerator. In some embodiments a tertiary amine based cure accelerator is used. As will be understood by those skilled in the art, tertiary amines act as a catalyst for the reaction between hydroxyl functional groups and isocyanates. Therefore, including a tertiary amine in the base component has the advantage of accelerating the reaction between hydroxyl functional prepolymers and the isocyanate groups. In some embodiments a tin based cure accelerator is used. In some embodiments a bismuth based cure accelerator is used. In some embodiments, the cure accelerator reacts with the curing agent (i.e. the isocyanate prepolymer) to speed up the curing reaction.

In some embodiments, the base component includes an amount of carbon fibres. Inclusion of the carbon fibres in the base component results in the cured mixed composition containing carbon fibres. In some embodiments, the carbon fibre is 500μη or less in length, for example 200μη or less, for example between 50μη and 200μη in length, for example between 80 and 150μη in length. In some embodiments the carbon fibres are between 5 and 25μη in width, for example between 5 and 15μη, for example between 5 and 10μη. In some embodiments, the carbon fibres have a width of 7μη.

In some embodiments, the base component includes an amount of catalyst formulated to catalyse the reaction between the hydroxyl functional prepolymers and the isocyanate groups in the activator. Addition of such a catalyst accelerates the cure reaction and so reduces the cure time. Therefore, by adjusting the amount of catalyst used, the cure time of the composition can be adjusted. Any suitable catalyst may be used, for example a tin or bismuth based catalyst. In some embodiments the product sold as TIB KAT® 716 by TIB Chemicals may be used since this is considered to be harmless and so suitable for use in a potable water supply. In some embodiments, the catalyst is formulated to speed up the cure reaction, but is not directly involved with it.

The composition includes a second component, an activator. The activator includes a liquid isocyanate polymer blend.

When the base component and activator component are mixed together, they cure to form a hard polymer layer. The base component and the activator component of the composition are formulated to be mixed in the ration of 4:1 by volume of base component to activator component. When the base component and activator component are mixed, the hydroxyl groups of the base component react with the isocyante of the activator to produce a polyurethane according to reaction mechanism (1) below (where and R' are alkyl or aryl groups).

R—OH+R'—N=C=O(isocyanate)→R'N(H)C(O)OR(urethane linkage)     (1)

It is believed that, in the composition disclosed herein, each hydroxyl functional prepolymer reacts with a single isocyanate molecule.

In the case where the base component also comprises liquid polymer resin having amine functional groups, the amine groups of the base component react with the isocyanate of the activator to produce polyurea according to the reaction mechanism (2) below (where R and R' are alkyl or aryl groups).

R—NH$_2$+R'—N=C=O→RN(H)C(O)N(H)R'(urea linkage)(2)

It is believed that, in the composition disclosed herein, each amine functional prepolymer reacts with a single isocyanate molecule.

Where there is water present in the base component, the isocyanate of the activator will react with this water in preference to the hydroxyl and amine functional groups of the base component according to the reaction mechanism (3) below (where R and R' are alkyl or aryl groups).

H$_2$O+R—N=C=O(isocyanate)→R—NH$_2$+CO$_2$

R—NH$_2$+R'—N=C=O→RN(H)C(O)N(H)R'(urea linkage)     (3)

Consequently the desired polymers will not be formed. In addition, the reaction between isocyanates and water produces $CO_2$ as a bi-product which results in undesirable bubbling in the resulting polymer. Therefore, the removal or reduction of the amount of water present in the base component by the addition of a drying agent is advantageous to encourage the mixed composition to follow reaction mechanism (1) and (2) above. When the mixed composition is applied to the surface of a pipe, the mixed composition is at this stage exposed to water in the atmosphere. Accordingly the addition is a drying agent is also advantageous in drying the mixed composition as it is applied to the pipe, thereby reducing the amount of $CO_2$ produced and therefore reducing the amount of bubbling in the resulting polymer.

Example 2

A composition for lining a pipe was made using a base component and activator having the following constituents:

| Constituent | Percentage by weight of the respective component |
|---|---|
| Base Component | |
| Liquid polymer resin including a hydroxyl functional prepolymer Isopol 160-3500 and/or Desmophen ® 1150 | 20.039 |
| Liquid polymer resin including a hydroxyl functional prepolymer Isopol 230-3000 and/or Desmophen ® 1145 | 13.625 |
| Filler liquid Castor oil | 3.286 |
| Mineral pigment Sillitin Z 86 puriss | 16.015 |
| Mineral pigment Portaryte ® B15 | 20.703 |
| Colour pigment Titanium dioxide | 0.951 |
| Moisture scavenger liquid or solid Sylosiv ® A3 | 5.000 |
| Thickener Cab-o-sil ® TS-720 | 1.219 |
| Liquid polymer resin including an amine functional prepolymer Ethacure ® 100 | 0.482 |
| Cure accelerator Dabco ® 33-LV | 0.402 |
| Carbon Fibre Sigrafil C M150-3.0 | 18.278 |
| Activator Component | |
| Isocyanate polymer blend Desmodur ® VL and/or Suprasec ® 2496 | 100.00 |

To make the base component of Example 2, the Isopol 160-3500 and castor oil are introduced into a clean vessel and mixed using a high speed disperser. Sillitin Z 86 puriss, Portaryte® B15, Titanium dioxide, Sylosiv® A3 and Cab-o-sil® TS-720 are slowly added to the mixture and mixed at a relatively high speed until a dispersion of 4-5 hegman is achieved. Speeds of between 500 and 5000 rpm are used for this stage.

At a slow mixing speed, for example about 500 rpm, the Isopol 230-300 and the Ethacure® 100 are added to the mixture. The cure time is adjusted using the Dabco® 33-LV.

Under slow speed stirring, for example 500-600 rpm, the Sigrafil C M150-3.0 is added and stirred into the mixture until fully mixed in. The mixture is then passed through a 3 mm mesh to remove any contaminants.

Example 3

A composition for lining a pipe was made using a base component and activator having the following constituents:

| Constituent | Percentage by weight of the respective component |
| --- | --- |
| Base Component | |
| Liquid polymer resin including a hydroxyl functional prepolymer Isopol 160-3500 and/or Desmophen ® 1150 | 19.98 |
| Liquid polymer resin including a hydroxyl functional prepolymer Isopol 230-3000 and/or Desmophen ® 1145 | 13.58 |
| Filler liquid Castor oil | 3.37 |
| Mineral pigment Stillitin Z 86 puriss | 16.08 |
| Mineral pigment Portaryte ® B15 | 14.68 |
| Colour pigment Titanium dioxide | 6.93 |
| Moisture scavenger liquid or solid Sylosiv ® A3 | 4.99 |
| Thickener Cab-o-sil ® TS-720 | 1.19 |
| Liquid polymer resin including an amine functional prepolymer Ethacure ® 100 | 0.48 |
| Cure accelerator Dabco ® 33-LV | 0.40 |
| Carbon Fibre Sigrafil C M150-3.0 | 18.22 |
| Catalyst TIB KAT ® 716 | 0.10 |
| Activator Component | |
| Isocyanate polymer blend Desmodur ® VL and/or Suprasec ® 2496 | 100.000 |

To make the base component of Example 3, the following method can be used. The Isopol 160-3500, Isopol 230-3000 and Castor Oil are introduced into a clean vessel under a suitable sized high speed disperser (HSD). It has been found that addition of all the liquid resins comprising hydroxyl functional prepolymers at the beginning of the process facilitates the manufacturing process. It has also been found that the resins mix together easily and so high speed dispersion is not required at this stage.

The mixer is turned on and the Sillitin Z 86 puriss, Portaryte® B15, Titanium dioxide and Sylosiv® A3 are slowly added. The mixer is then run at high speed until a dispersion of 4-5 hegman is achieved. Sigrafil C M150-3.0 is slowly added, ensuring that dust is kept to a minimum, for example by pouring into the moving vortex under the mixer. Dabco® 33-LV and Ethacure® 100 are then added. It is believed that the Sigrafil C M150-3.0 may absorb some of the Ethacure® 100. Accordingly the Ethacure® 100 is added after the Sigrafil C M 150-3.0 is fully dispersed. It is believed this promotes the reactivity of the base composition.

The Cab-o-sil® TS-720 is then added to the mixture, ensuring that dust is kept to a minimum, for example by pouring into the moving vortex under the mixer. Due to the large viscosity increase when the Cab-o-sil® TS-720 is added, this is added towards the end of the process when the majority of the components have been introduced.

The mixture is mixed for approximately 30 minutes. To facilitate handling, the temperature is kept below 90° C.

TIB KAT® 716 is added to adjust the cure time (or gel time). This is added at the end for a final adjustment of the composition. The mixture is then passed through a 3 mm mesh to remove any contaminants.

The base component of examples 1 to 3 has been found to be dilatant, otherwise termed shear thickening. Accordingly, the viscosity of the base component increases with the applied shear stress. Conversely, the viscosity of the base component is less when lower shear forces are applied.

Compositions disclosed herein, for example those in examples 1 to 3 above, can be used to line a pipe by applying the mixed composition to the interior of the pipe before the mixed composition has cured. The mixed composition can be applied to a pipe which is in service, or to a new pipe prior to the pipe being positioned in place for use.

Figure 2:
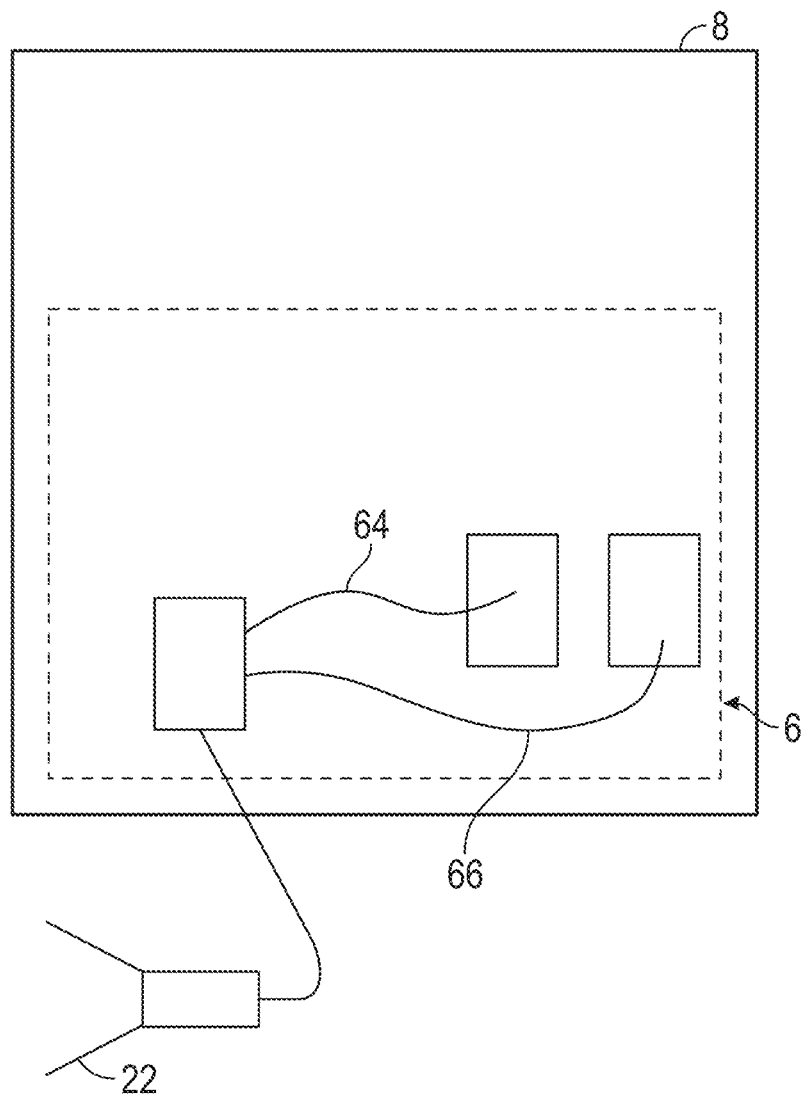
FIG. 2 shows an apparatus for applying a composition to a substrate.

Referring to FIG. 2, an apparatus 6 which can be used to apply a composition to a water pipe 4 is shown. The apparatus 6 is housed in a vehicle 8 such that the apparatus 6 can be transported to the location of the pipe 4 such that the composition can be applied to a pipe 4 in situ.

Figure 3:
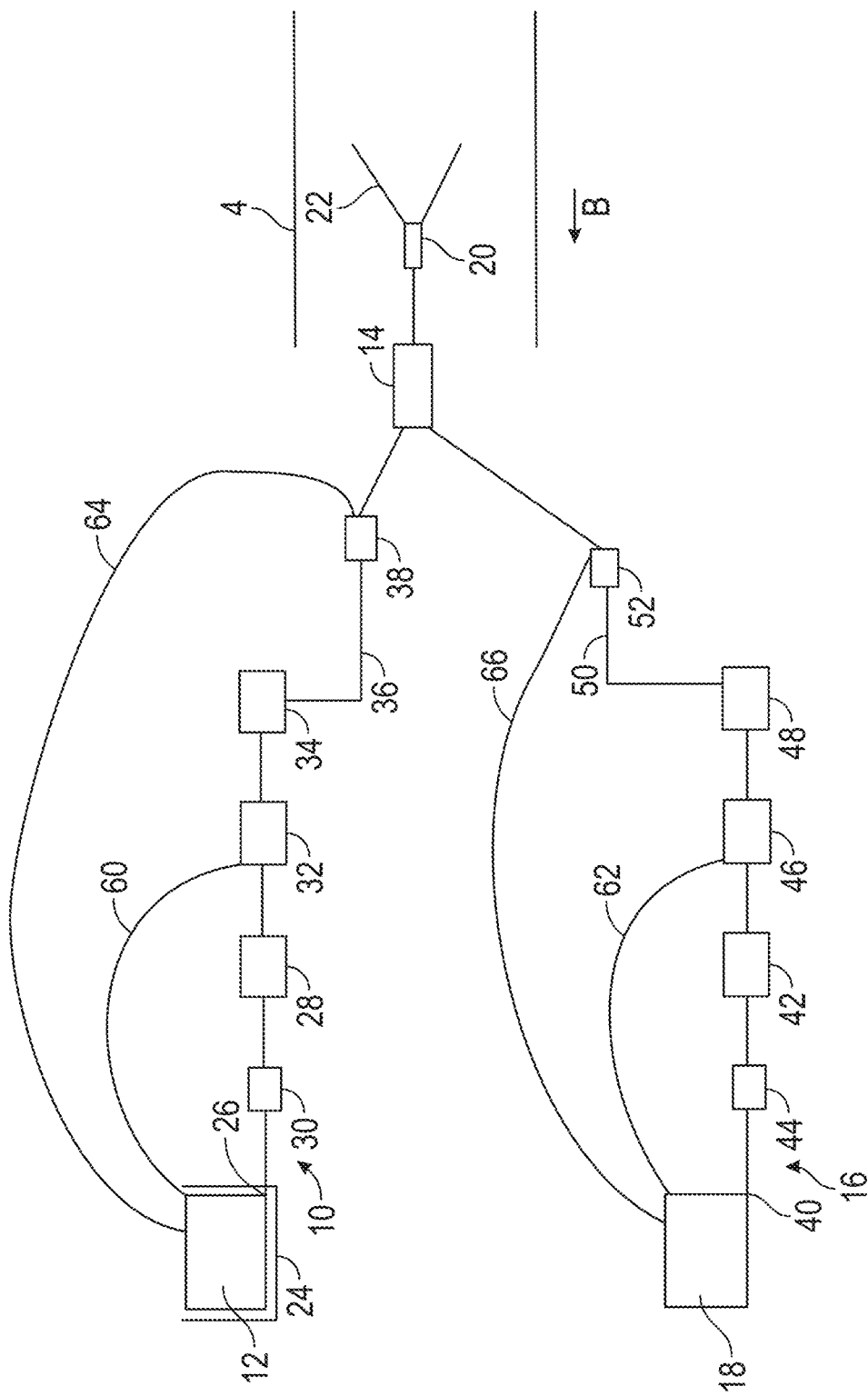
FIG. 3 shows a schematic illustration of the apparatus of FIG. 2.

A schematic illustration of the apparatus 6 is shown in FIG. 3. The apparatus 6 includes a flow path 10 for a first component of a composition, for example the base component of examples 1 to 3 above. This flow path shall be referred to as the base flow path 10. The base flow path 10 is configured to carry the base component from a base tank 12 to a mixer 14. The apparatus 6 also includes a flow path 16 for a second component of a composition, for example the activator component of examples 1 to 3 above. This flow path shall be referred to as the activator flow path 16. The activator flow path 16 is configured to carry the activator component from an activator tank 18 to the mixer 14.

The mixer 14 includes a baffle (not shown) configured to mix the activator and base components together to form a mixed composition. The mixer 14 is in fluid communication with a feed tube 20 which is configured to introduce the mixed composition into an applicator head 22, from which the mixed composition is applied to the interior of a pipe 4 to line the pipe 4.

Referring to FIG. 3, the base flow path 10 comprises a base tank 12. The base tank 12 is in the form of a cylindrical tank having a cylindrical side wall coupled to a base. Alternatively, the base tank 12 is cuboid in shape and includes four side walls coupled to a base. Other suitably shaped tanks may be used. The base tank 12 is provided with a heating jacket 24 extending around the base and the side wall(s). The heating jacket 24 includes two skins and an insulating space therebetween and is configured to apply heat to the base tank 12. The base tank 12 includes an outlet 26 from which the base component can leave the tank 12. The outlet 26 can be opened and closed by employing a tap (not shown). The outlet is 7.62 cm (3") in diameter. In some embodiments, the outlet is between 6 cm and 10 cm in diameter. The outlet 26 of the base tank 12 is in fluid communication with a pump 28 configured to pump the base component along the base flow path 10. A filter 30 is provided between the outlet 26 of the base tank 12 and the pump 28. The filter 30 is configured to remove contaminants from the base component as it flows through the filter 30. The filter 30 has a mesh diameter of about 3 mm.

The pump 28 is in fluid communication with a heater 32 which is configured to heat the base component. The heater 32 is in fluid communication with a flow meter 34 which is configured to measure the flow of base component through the flow path 10.

The flow meter 34 comprises positive displacement flow meter, for example a gear flow meter. In some embodiments, the flow meter 34 is a helical gear flow meter. In a helical gear flow meter, an arrangement of helical or spiral shaped gears is provided to measure flow through the flow meter. For example, an S series helical screw geared flow meter as manufactured by VSE.flow® can be used. Such flow meters operate based on the screw pump principle.

The heater 32 is also in fluid communication with the base tank 12 via a short cycle path 60. The base component can be passed around this short cycle path 60, for example, when increased heating of the base component is required. The flow meter 34 is coupled to the mixer 14 via a base line hose 36, through which the base component can flow. The base line hose 36 has a diameter of 25 mm or more.

The base flow path 10 is at least partially lined with polytetrafluoroethylene (PTFE). For example, all or part of the base line hose 36 is lined with PTFE.

In some embodiments, the base flow path 10 is at least partially lined with nylon. For example, all or part of the base line hose 36 is lined with nylon.

The base line hose 36 terminates at a non-return valve 38 such that fluid cannot enter the base line hose 36 at this point. The non-return valve has a diameter of 19.05 mm. The terminal end of the base line hose 36, for example the non-return valve 38, is also coupled to a return base line hose 64 which is in fluid communication with the base tank 12. The base component can be returned to the base tank 12 via the return base line hose 64, for example when additional heating is required. As can be seen from FIG. 3, the activator flow path 16 has a similar construction. The activator flow path 16 comprises an activator tank 18. The activator tank 18 is in the form of a cylindrical tank having a cylindrical side wall coupled to a base. Alternatively, the activator tank 18 is cuboid in shape and includes four side walls coupled to a base. Other suitably shaped tanks may be used. The activator tank 18 has an outlet 40. The outlet 40 can be opened and closed by employing a tap (not shown). The outlet 40 which is in fluid communication with a pump 42 configured to pump the activator component along the activator flow path 16. A filter 44 is provided between the outlet 40 of the activator tank 18 and the pump 42. The filter 44 is configured to remove contaminants from the activator component as it flows through the filter 44. The pump 42 is in fluid communication with a heater 46 which is configured to heat the activator component. The heater 46 is in fluid communication with a flow meter 48 which is configured to measure the flow of the activator component through the flow path 16. The heater 46 is also in fluid communication with the activator tank 18 via a short cycle path 62. The activator component can be passed around this short cycle path 62, for example, when increased heating of the activator component is required.

Figure 4:
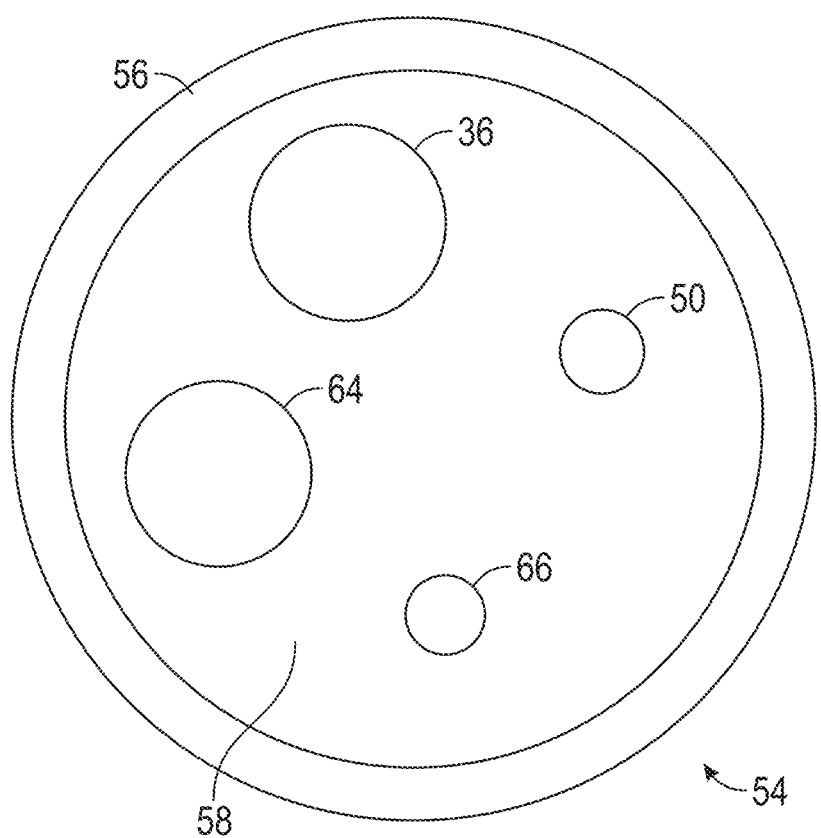
FIG. 4 shows a cross-sectional schematic illustration of a supply line of the apparatus of FIG. 2.

The flow meter 48 is coupled to the mixer 14 via an activator line hose 50, through which the activator component can flow. The activator line hose 50 has a diameter of 6.35 mm (0.25"). In some embodiments, the activator line hose 50 can have a diameter of between 5 mm and 25 mm for example between 5 and 15 cm. The activator line hose 50 terminates at a non-return valve 52 such that fluid cannot enter the activator line hose 52 at this point. The terminal end of the activator line hose 50, for example the non-return valve 52, is also coupled to a return activator line hose 66 which is in fluid communication with the activator tank 16. The activator component can be returned to the activator tank 18 via the return activator line hose 66, for example when additional heating is required. With reference to FIG. 4, the base line hose 36, the return base line hose 60, the activator line hose 50, and the return activator line hose 66 are carried together in a supply line 54. The supply line 54 includes an insulating case 56 configured to carry at least a portion of the base line hose 36, the return base line hose 60, the activator line hose 50, and the return activator line hose 66. The supply line 54 is filled with oil 68 which can be heated to heat the activator and base components which are being carried down the respective hoses. The supply line 54 can be of any desired length, for example between 100 and 300 m, for example between 150 m and 250 m. In some embodiments, the supply line 54 is 200 m in length. The base line hose 36 and the activator line hose 50 are in fluid communication with the mixer 14 such that base component and activator component can be introduced to the mixer 14. The mixer 14 includes a baffle configured to mix the activator and base components together to form a mixed composition. The mixer 14 is in fluid communication with a feed tube 20 which is configured to introduce the mixed composition into an applicator head 22.

Figure 5:
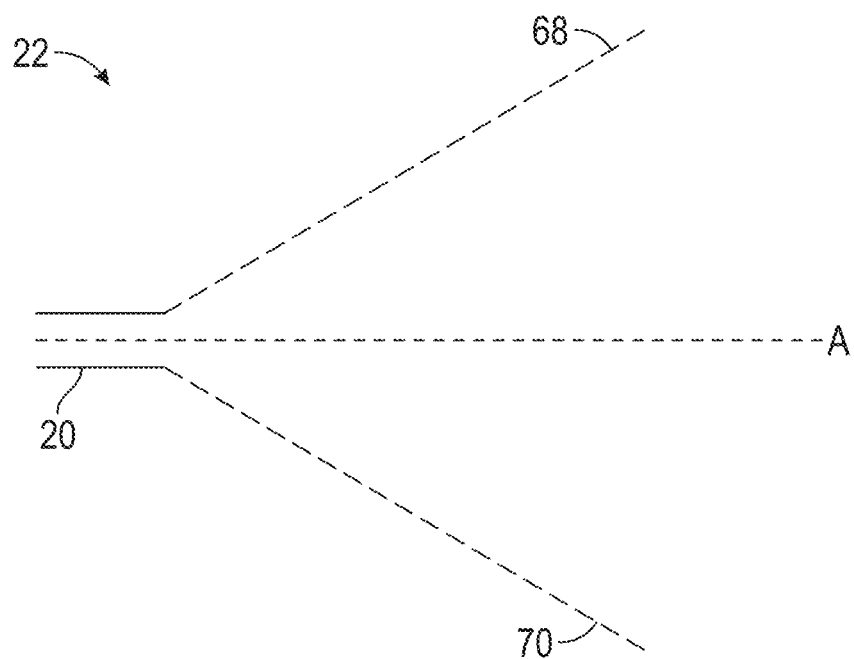
FIG. 5 shows a schematic illustration of the applicator head of the apparatus of FIG. 2.
Figure 6:
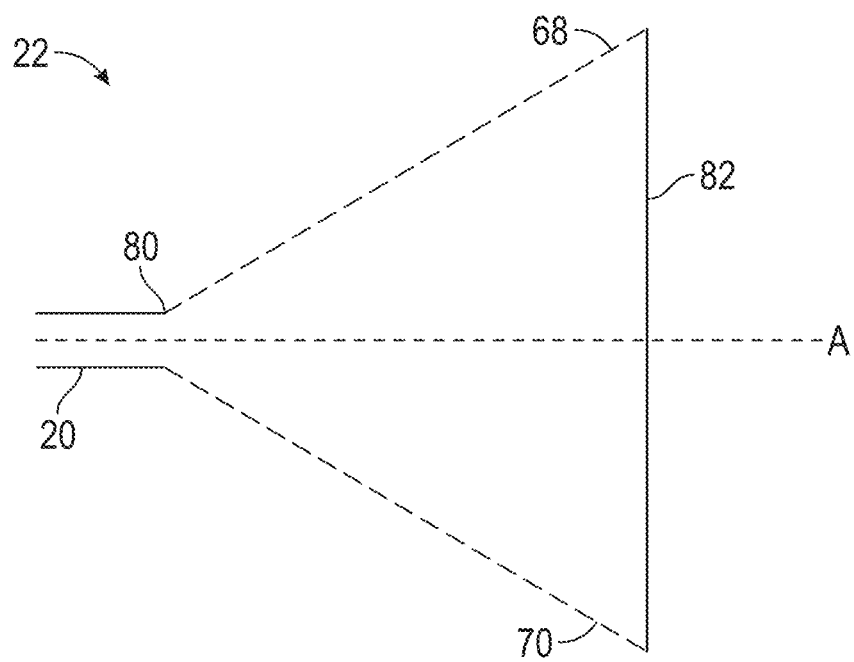
FIG. 6 shows a schematic illustration of a different embodiment of the the applicator head of the apparatus of FIG. 2.

As shown in FIG. 5, the applicator head 22 is shaped to form a hollow truncated cone 68, the narrow end of the truncated cone 68 being coupled to the feed tube 20 such that mixed composition can be introduced onto the interior surface of the truncated cone 68. The hollow truncated cone 68 is approximately 10 cm to 30 cm in length, for example between 15 cm and 20 cm in length, for example between 15.24 cm and 20.32 cm (6" to 8"). In some embodiments the wide end of the truncated cone 68 is open such that the mixed composition can exit the applicator head 22 through the open end of the truncated cone 68. In other embodiments, the wide end of the truncated cone 68 is closed. In some embodiments, the applicator head comprises a cylindrical portion instead of a truncated cone. The applicator head 22 includes a plurality of applicator holes 70 arranged to extend through the surface of the cone 68 such that the interior and exterior of the cone 68 are in fluid communication. The applicator holes 70 are arranged evenly around the surface of the truncated cone 68. In some embodiments, the applicator holes 70 are arranged to form a spiral of holes 70 around the surface of the truncated cone 68. For example, in some embodiments the applicator holes are arranged to form two spirals, for example one being left-handed and one being right-handed. In other embodiments, other suitable arrangements of the applicator holes 70 are used, for example, the holes 70 may be arranged to form concentric rings around the truncated cone 68 or may be arranged in lines extending from the narrow end of the truncated cone 68 to the wide end or may be arranged to form a cross shape. The applicator holes 70 have a diameter of approximately 3 mm. In some embodiments a larger diameter is used.

The applicator head 22 is mounted on the feed tube 20 such that it is free to rotate about an axis A, as shown in FIG. 5. The axis A is the axis of symmetry of the truncated cone 68 and extends from the narrow end of the truncated cone 68 to the wide end. The applicator head 22 is coupled to a motor (not shown) which is configured to drive rotation of the applicator head 22. In use, for example to apply the composition of examples 1 to 3 above, the applicator head 22 of the apparatus is positioned inside a pipe 4 to be lined. A base component is introduced into the base tank 12. The outlet 26 of the tank 12 is initially closed. Once the base component has been introduced to the base tank 12, the tank is sealed and pressured with nitrogen or dry air. Pressurising the tank facilitates flow of the base component through the base flow path 10. In the tank 12, the base component is heated to between 6° and 70° C. Heating the base component to this temperature also facilitates flow of the base component. The heating jacket 24 acts to facilitate heating of the base component. When the base component has reached the desired temperature, the outlet 26 is opened and the base component flows through the outlet 26. The outlet 26 of the base tank 12 is relatively large at 7.62 cm (3") in diameter. This larger diameter reduces the shear forces acting on the base component which, due to the shear thickening nature of the base component, encourages the base component to maintain a relatively low viscosity and hence facilitates flow of the base component out of the base tank.

The base component passes along the base flow path 10 to the pump 28. In doing so, the base component passes through the filter 30. The filter 30 has a mesh diameter of 3 mm. A mesh diameter of 3 mm or more is advantageous in permitting carbon fibres present in the base component to pass through the filter 30, with a low risk of the carbon fibres clumping together and blocking the filter 30. If the filter mesh is too small in diameter, carbon fibres present in the base component are prone to clumping and blocking the filter.

The pump 28 pumps the base component along the flow path 10 to the heater 32. Heating the base component facilitates the flow of the base component. Should additional heating be required, the base component is directed back to the base tank 12 along the short cycle path 60. Alternatively, the base component is directed from the heater 32 to the flow meter 34, where the flow of the base component can be measured. It has been found that the use of a helical gear flow meter is advantageous since the carbon fibre present in the base component tends not to clog the helical gears.

From the flow meter, the base component enters the base line hose 36. It has been found that by lining at least part of the base flow path 10, for example at least part of the base line hose 36, with PTFE, carbon fibres present in the base component are less likely to become embedded in the hose wall. When carbon fibres become embedded in the hose wall, they tend to clump together, clogging the base line. Therefore, the use of PTFE to line the base line hose 36 reduces the likelihood of the base line 36 becoming blocked. Further, since the use of PTFE reduces the likelihood of carbon fibres becoming embedded in the base line wall, the pressure applied to the base component flowing through the base line hose 36 can be increased. This can be achieved by reducing the diameter of the base line hose 36. Increasing the pressure applied to the base component can be advantageous in ensuring the correct mix ratio of base to activator components.

Turning to the activator flow path, in use, activator component is introduced to the activator tank 18. The outlet 40 of the tank 18 is initially closed. Once the activator component has been introduced into the activator tank 18, the tank is sealed and pressurised with nitrogen or dry air. Pressurising the tank 18 facilitates flow of the activator component through the activator flow path 16. Since the activator component comprises isocyanate which reacts with water, it is advantageous to pressurise the activator tank with dry air to prevent reaction of the isocyanate with water.

The activator in the tank 18 is heated and, when it has reached the desired temperature, the outlet 40 is opened and the activator component flows through the outlet 40.

The activator component passes along the activator flow path 16 to the pump 42. In doing so, the activator component passes through the filter 44 to remove contaminants from the activator. The pump 42 pumps the activator component along the flow path 16 to the heater 46. Heating the activator component facilitates the flow of the activator component. Should additional heating be required, the activator component is directed back to the activator tank 18 along the short cycle path 62. Alternatively, the activator component is directed from the heater 46 to the flow meter 48, where the flow of the activator component can be measured. From the flow meter, the activator component enters the activator line hose 50.

The base component and the activator component flow along the respective line hose 36, 50 through the supply line 54. The insulating case 56 of the supply line 54 acts to reduce loss of heat from the base and activator components and therefore to facilitate flow of these components. In addition, the base line hose 36 and the activator line hose 50 are immersed in hot oil 56 within the supply line 54. This hot oil 56 acts to further heat the base component and the activator component as they flow along the supply line 54, thereby further facilitating flow of the components. At the end of the base line hose 36 the base component flows through a non-return valve 38.

Should further heating of the base component be required, the base component is directed along the return base line hose 64 to the base tank 12. Alternatively, the base component is directed to the mixer 14.

Similarly, at the end of the activator line hose 50 the activator component flows through a non-return valve 52. Should further heating of the activator component be required, the activator component is directed along the return activator line hose 64 to the activator tank 18. Alternatively, the activator component is directed to the mixer 14. The pump 28 of the base flow path 10 and the pump 42 of the activator flow path 16 are arranged to pump base component and activator component respectively to the mixer 14 such that the base component and activator component are mixed at a ratio of 4:1 by volume of base component to activator component. The mixer 14 includes flow path having a series of baffles such that, as the base and activator components pass along the mixer flow path, the baffles disrupt the flow to cause mixing of the base component and activator component.

The mixed composition then flows to the feed tube 20 from which is it introduced to the interior surface of the truncated cone 68 of the applicator head 22. The applicator head 22 is rotated about the axis A generating a centrifugal force. As the mixed composition flows along the internal surface of the truncated cone 68 it reaches the applicator holes 70. The centrifugal force generated by the rotating applicator head 22 causes the mixed composition to flow through the applicator hole 70 and atomise as it leaves the applicator hole 70. The applicator holes 70 are 3 mm in diameter or larger. A diameter of 3 mm or more is advantageous in permitting carbon fibres present in the mixed composition to pass through the applicator holes 70, with a low risk of the carbon fibres clumping together and blocking the holes 70. If the applicator holes 70 are too small in diameter, carbon fibres present in the base component are prone to clumping and blocking the holes 70.

The applicator head 22 is positioned inside a pipe 4 to be lined with the mixed composition. In this way, the mixed composition is applied to the interior of a pipe 4. Due to the long length of the supply line 54, the supply line 54 can be passed along a length of pipe 4 such that a long length of the pipe 4 can be coated with the composition. The applicator head 22 can be retracted along the pipe, in direction B shown on FIG. 3, such that a length of pipe 4 can be lined in a single application. If desirable, multiple applications or passes may be made to a length of pipe, alternatively, the pipe may be lined in a single pass. The cure time of the mixed composition is such that it does not cure until it has left the applicator head 22. A sufficiently long cure time is used to ensure that the mixed composition does not begin to harden until after the time taken for the mixed composition to flow along the length of the truncated cone 68 of the applicator head 22. Since the cure time can be tailored, a longer truncated cone length can be used, which enables the composition to be applied to a pipe in larger band widths and therefore more evenly.

Although the present disclosure has been described above with reference to one or more embodiments, it will be appreciated that various changes or modifications may be made without departing from the scope of the present disclosure as defined in the appended claims. For example, whilst the examples above are illustrative of an apparatus used to apply a composition disclosed herein, it will be appreciated that any suitable composition can be applied with the apparatus disclosed herein.

What is claimed is:

1. A method of applying a composition to a pipe, the method comprising the steps of:
    mixing a base component and an activator component to form a mixed composition, wherein the base component comprises hydroxyl functional prepolymers and the activator comprises isocyanate prepolymers, wherein the mixed composition further comprises an amount of carbon fiber, and wherein the hydroxyl functional prepolymers are formulated to polymerize with the isocyanate prepolymers to form a polymer containing carbon fiber;
    applying the mixed composition to the inside of a pipe with an apparatus, wherein the apparatus comprises;
    a first flow path for carrying the base component;
    a second flow path for carrying the activator component;
    a mixer coupled to the first flow path and the second flow path, wherein the mixer is configured to mix the base component and activator component to form the mixed composition;
    an applicator head coupled to the mixer, where the applicator head is configured for rotation about an axis and comprises an applicator hole, wherein the applicator is configured for applying the mixed composition to the inside of the pipe; and
    wherein the applicator hole comprises a plurality of the applicator holes spaced along an axial length of the applicator head, wherein the plurality of applicator holes are arranged in a spiral extending around a surface of the applicator head.

2. The method of claim 1, wherein:
    the applicator hole comprises a plurality of applicator holes arranged in a first spiral and a second spiral extending around a surface of the applicator head, wherein the first spiral is a right-handed spiral and the second spiral is a left-handed spiral.

3. The method of claim 1, wherein:
    the applicator head comprises a cylindrical portion, and wherein the applicator hole comprises a plurality of applicator holes extending through a surface of the cylindrical portion.

4. The method of claim 1, wherein:
    the applicator head comprises a first end coupled to the mixer, the applicator head comprises a second end distal the first end, and wherein the second end is closed.

5. The method of claim 1, wherein:
    at least one of the first flow path and the second flow path comprises a hose coupled to the mixer and configured to carry at least one of the base component and the activator component to the mixer, wherein the hose has a diameter of 25 mm or greater; and
    wherein the applicator hole has a diameter of 3 mm or greater.

6. The method of claim 1, wherein:
    at least one of the first flow path and the second flow path comprises a hose coupled to the mixer and configured to carry at least one of the base component and the activator component to the mixer, and wherein the hose is lined with polytetrafluoroethylene.

7. The method of claim 1, wherein:
    the applicator head is configured for atomizing the mixed composition by a centrifugal force generated by rotation of the applicator head about the axis.

8. The method of claim 7 wherein:
    The mixed composition is applied to the inside of the pipe by virtue of the centrifugal force.

9. The method of claim 1 further comprising:
    a motor coupled to the applicator head, wherein the motor is configured to drive rotation of the applicator head.

10. The method of claim 1, wherein:
    the base component comprises amine functional prepolymers.

11. The method of claim 1, further comprising:
    heating the base component in a first reservoir, wherein the first reservoir is coupled to the first flow path.

12. The method of claim 11, wherein:
    heating the base component in the first reservoir comprises heating the base component to a temperature of from 60 to 70 degrees Celsius.

13. An apparatus configured for application of a mixed composition to the inside of a pipe, the apparatus comprising:
    a first flow path for carrying a first component of the mixed composition,
    a second flow path for carrying a second component of the mixed composition,
    a mixer coupled to the first flow path and the second flow path, wherein the mixer is configured to mix the first component and the second component together to form the mixed composition,
    an applicator head coupled to the mixer, the applicator head configured for rotation about an axis, the applicator head comprising an applicator hole, the applicator head and applicator hole configured for applying the mixed composition to the inside of the pipe,
    wherein the applicator head comprises a first end coupled to the mixer, the applicator head comprises a second end distal the first end, and wherein the second end is closed, and
    wherein the applicator hole comprises a plurality of the applicator holes spaced along the axial length of the applicator head, wherein the plurality of applicator holes are arranged in a spiral extending around a surface of the applicator head.

14. The apparatus of claim 13, further comprising:
a first reservoir coupled to the first flow path, wherein the first reservoir comprises a heating jacket.

15. The apparatus of claim 13, wherein:
the plurality of applicator holes are arranged in a first spiral and a second spiral, wherein the first spiral is a right-handed spiral and the second spiral is a left-handed spiral.

16. The apparatus of claim 13, wherein:
the applicator head comprises a cylindrical portion, and wherein the applicator hole comprises a plurality of the applicator holes extending through a surface of the cylindrical portion.

17. The apparatus of claim 13, further comprising:
a motor coupled to the applicator head, wherein the motor is configured to drive rotation of the applicator head.

18. The apparatus of claim 13, wherein:
at least one of the first flow path and the second flow path comprises a hose coupled to the mixer, and wherein the hose is lined with polytetrafluoroethylene.

* * * * *